United States Patent
Kanza et al.

(10) Patent No.: US 12,069,179 B2
(45) Date of Patent: *Aug. 20, 2024

(54) BLOCKCHAIN-POWERED LEDGER FOR A DATA SUPPLY CHAIN

(71) Applicant: AT&T Intellectual Property I, L.P., Atlanta, GA (US)

(72) Inventors: Yaron Kanza, Fair Lawn, NJ (US); Divesh Srivastava, Summit, NJ (US); Tamraparni Dasu, New Vernon, NJ (US); Eleftherios Koutsofios, Berkeley Hts, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,046

(22) Filed: Mar. 6, 2023

(65) Prior Publication Data
US 2023/0208647 A1 Jun. 29, 2023

Related U.S. Application Data

(63) Continuation of application No. 16/854,418, filed on Apr. 21, 2020, now Pat. No. 11,626,992.

(51) Int. Cl.
*H04L 29/06* (2006.01)
*G06F 16/23* (2019.01)
(Continued)

(52) U.S. Cl.
CPC ........ *H04L 9/3236* (2013.01); *G06F 16/2365* (2019.01); *G06F 16/2379* (2019.01); *H04L 9/3297* (2013.01); *H04L 9/50* (2022.05)

(58) Field of Classification Search
CPC ....... H04L 9/3236; H04L 9/3297; H04L 9/50; H04L 9/3239; H04L 9/3247; G06F 16/2365; G06F 16/2379
See application file for complete search history.

(56) References Cited

U.S. PATENT DOCUMENTS 9,679,276 B1 6/2017 Cuende
9,928,290 B2 3/2018 Tiell
(Continued)

FOREIGN PATENT DOCUMENTS

WO 2015116998 A2 8/2015
WO 2018059334 A1 4/2018
(Continued)

OTHER PUBLICATIONS

Hyperledger Blockchain Performance Metrics, https://wiki.hyperledger.org/groups/pswg/performance-and-scale-wg), Oct. 2018, pp. 1-17.
(Continued)

*Primary Examiner* — Mahfuzur Rahman
(74) *Attorney, Agent, or Firm* — GUNTIN & GUST, PLC; Dana B. LeMoine

(57) ABSTRACT

Aspects of the subject disclosure may include, for example, a device with a processing system including a processor; and a memory that stores executable instructions that, when executed by the processing system, facilitate performance of operations including receiving a first record of sending a file and a hash for the file from a sender of the file; recording the first record on a blockchain; providing the first record to a receiver of the file; and monitoring a predetermined time period in which to receive a second record of receiving the file and the hash for the file. Other embodiments are disclosed.

20 Claims, 13 Drawing Sheets

(51) Int. Cl.
*H04L 9/32* (2006.01)
*H04L 9/00* (2022.01)

(56) References Cited

U.S. PATENT DOCUMENTS

| | | |
|---|---|---|
| 10,114,980 B2 | 10/2018 | Barinov et al. |
| 10,509,932 B2 | 12/2019 | Ebrahimi et al. |
| 10,530,859 B1 | 1/2020 | Todd |
| 2016/0012465 A1* | 1/2016 | Sharp ............... G06Q 20/321 705/14.17 |
| 2016/0283920 A1 | 9/2016 | Fisher et al. |
| 2018/0253464 A1 | 9/2018 | Kohli et al. |
| 2018/0307883 A1 | 10/2018 | Ebrahimi et al. |
| 2019/0014176 A1 | 1/2019 | Tormasov et al. |
| 2019/0057379 A1 | 2/2019 | Chalakudi et al. |
| 2019/0098015 A1 | 3/2019 | Hookham-Miller |
| 2019/0103958 A1 | 4/2019 | Wu |
| 2019/0158594 A1 | 5/2019 | Shadmon et al. |
| 2019/0172073 A1* | 6/2019 | Wiig ............... H04L 9/0852 |
| 2019/0220615 A1 | 7/2019 | Zhang et al. |
| 2019/0279750 A1 | 9/2019 | Wang |
| 2019/0332821 A1 | 10/2019 | Ebert et al. |
| 2019/0372778 A1 | 12/2019 | Palaniappan et al. |
| 2019/0377811 A1 | 12/2019 | Aleksander et al. |
| 2019/0377889 A1 | 12/2019 | Mertens et al. |
| 2019/0386833 A1 | 12/2019 | Alger et al. |
| 2020/0019717 A1* | 1/2020 | Steffey ............... H04L 9/3239 |
| 2020/0204574 A1* | 6/2020 | Christian ............... H04L 63/12 |
| 2021/0328803 A1 | 10/2021 | Kanza et al. |

FOREIGN PATENT DOCUMENTS

| | | |
|---|---|---|
| WO | 2019195821 A1 | 10/2019 |
| WO | 2019215437 A1 | 11/2019 |
| WO | 2019229612 A1 | 12/2019 |
| WO | 2019236638 A1 | 12/2019 |

OTHER PUBLICATIONS

Do, Hoang Giang, Blockchain-based system for secure data storage with private keyword search, 2017 IEEE World Congress on Services (Services). IEEE, 2017.

Liu, Bin , Blockchain based Data Integrity Service Framework for IoT data, 2017 IEEE International Conference on Web Services (ICSW). IEEE, 2017, pp. 1-4.

Sarikaya, Salih , How Blockchain Will Disrupt Data Science: 5 Blockchain Use Cases in Big Data, https://towardsdatascience.com/how-blockchain-will-disrupt-data-science-5-blockchain-use-cases-in-big-data-e2e254e3e0ab, Jan. 13, 2020, pp. 1-6.

Zorzini, Catalin , Why Data Scientists Are Falling in Love with Blockchain Technology, (https://www.izooto.com/getting-started-with-izooto tm_source=referral&utm_medium=PoweredBy&utm_campaign=https%3A%2F%2Fwww.techopedia.com), Aug. 9, 2019, pp. 1-5.

* cited by examiner

BLOCKCHAIN-POWERED LEDGER FOR A DATA SUPPLY CHAIN

CROSS REFERENCE TO RELATED APPLICATIONS

This application is a continuation of U.S. patent application Ser. No. 16/854,418 filed on Apr. 21, 2020. All sections of the aforementioned application are incorporated by reference herein in their entirety.

FIELD OF THE DISCLOSURE

The subject disclosure relates to a blockchain-powered ledger for a data supply chain.

BACKGROUND

Data is often collected or created, and distributed, in a process that resembles distribution of physical items in a supply chain, by transferring data items from producers to consumers along a chain of carriers. In a data supply chain, the data is shipped between machines potentially owned by different organizations, or by independent departments within an organization. End-to-end tracking of the data helps guarantee reliable data transfer at each link of the chain, and along the entire supply chain.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for ensuring proper data transfer using a blockchain. Other embodiments are described in the subject disclosure.

One or more aspects of the subject disclosure include a device with a processing system including a processor; and a memory that stores executable instructions that, when executed by the processing system, facilitate performance of operations including receiving a first record of sending a file and a hash for the file from a sender of the file; recording the first record on a blockchain; providing the first record to a receiver of the file; and monitoring a predetermined time period in which to receive a second record of receiving the file and the hash for the file.

One or more aspects of the subject disclosure include a machine-readable medium with executable instructions that, when executed by a processing system including a processor, facilitate performance of operations including sending a file to a receiver; sending a record of the sending of the file and a hash for the file to a blockchain agent, wherein the blockchain agent transforms the record into a common record structure and writes the common record structure on a blockchain; and determining whether the blockchain comprises an indication that the file was received within a predetermined time period.

One or more aspects of the subject disclosure include a method including steps of receiving, by a processing system including a processor, a file; calculating a hash for the file; and sending, by the processing system, a record of the receiving the file and the hash for the file to a blockchain agent, wherein the blockchain agent records the record on a blockchain.

Figure 1:
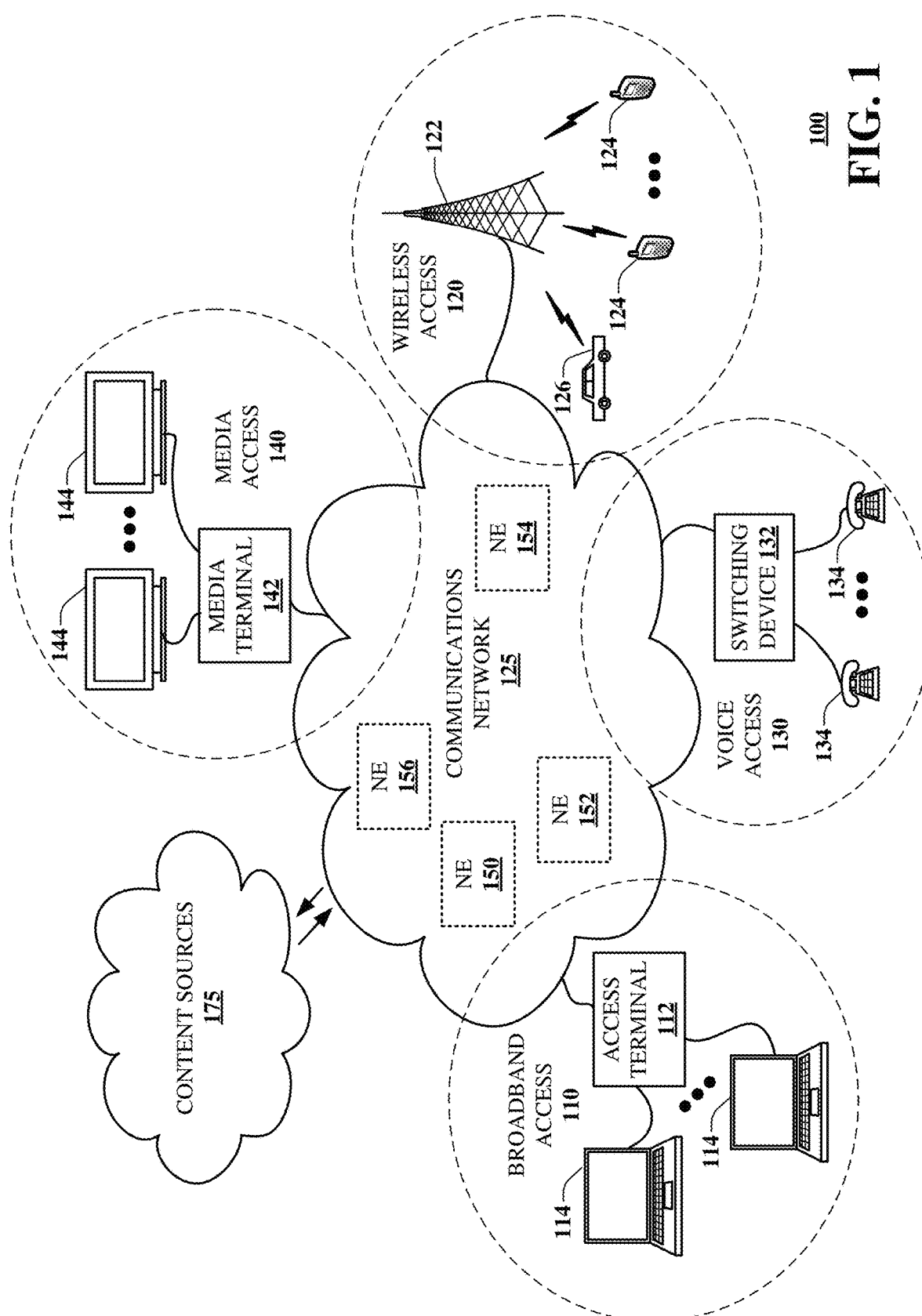
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate in whole or in part sending a file to a receiver; sending a record of the sending of the file and a hash for the file to a blockchain agent for recording the record on a blockchain; receiving records of sending a file and a hash for the file from a sender of the file; recording records on a blockchain; providing records to a receiver of the file; and sending a record of the receiving the file and the hash for the file to a blockchain agent for recording on a blockchain.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In many modern organizations, data supply chains are becoming an essential tool for data handling and dissemination. Data processing is performed as a sequence of actions executed on different machines:

Acquisition, e.g., from sensors and customer devices, executed in a variety of ways;

Enrichment, e.g., through cleansing, integration with other data sources, aggregation, validation; and Knowledge discovery through exploratory data analysis, visualization, analytics and trends.

As part of the data supply chain, data are sometimes distributed—sent to a storage, e.g., a data lake, or shipped to customers, e.g., divisions within the company or other companies and organizations. Data transfer between machines, in a supply chain, is a series of handoffs. In each handoff there is a sender node and a receiver node—files or data items are transferred via the network from the sender to the receiver. The supply chain is often represented as a directed graph where the participating machines are represented by nodes and each handoff relationship is represented by a directed edge from the sender node to the receiver node. The sender-receiver relationship is many-to-many, that is, a sender can transfer data items to many receivers, and a receiver can receive data from many senders. A receiver may process the data and transfer the files to the next node(s) in the chain.

Valuable data refers to data that are used by downstream application, differently from data that are just being transferred as part of the transfer protocols, like TCP handshake or HTTP headers. Transfers are typically a stream of valuable data between the nodes, often transferred with high velocity, volume and variety. Velocity is a measure of how fast data arrives. High velocity is less like a stream of data, but more like a flood. Volume is the amount of data that must be stored. Variety is the type of data, ranging from photographs and videos to spreadsheets and sensor data.

Figure 2A:
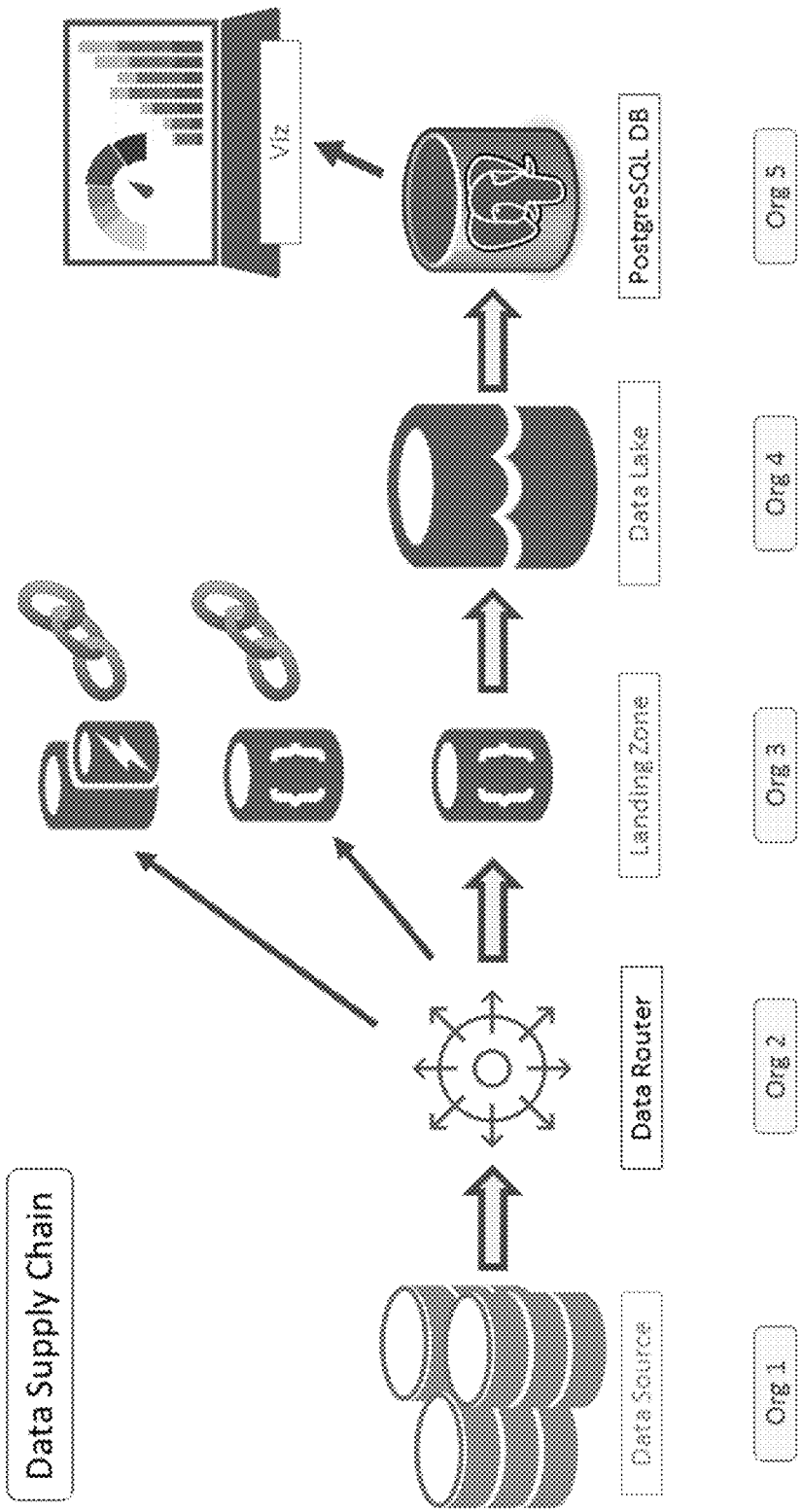
FIG. 2A is a block diagram illustrating an example, non-limiting embodiment of a data supply chain functioning within the communication network of FIG. 1 in accordance with various aspects described herein.

FIG. 2A is a block diagram illustrating an example, non-limiting embodiment of a data supply chain functioning within the communication network of FIG. 1. As shown in FIG. 2A, each node is managed by different organization. In this example, a telecommunications entity (Org 1) publishes call detail record (CDR) files to the data router (DR, Org 2). Different subscribers receive the files from DR, one such subscriber is the research data lake (RDL). The chains represent subscribers that are a part of other data supply chains. The files arrive in a landing zone (Org 3) and are then transferred to a Hadoop cluster (Org 4). An application (Org 5) that studies network effects (communities of interest) computes certain tables that are shipped as comma separated value (CSV) files to be stored in a database managed by a PostgreSQL database management system. This database is then used by a visualization application.

Given the size of the data and the various organization, and the siloed nature of the organizations, tracing and resolving problems is an incredibly manual process involving locating contact information of responsible individuals, sending emails, making phone calls, holding meetings over multiple days and weeks across multiple organizations, at the expense of productivity. Data flow along a data supply chain could go wrong. Some examples include:

data loss
data duplication
partial transfer of files
delayed or out of order data transfer
unauthorized data transfer
skipping validation
improper data manipulation.

With data loss, files could be dropped between handoffs, for a multitude of reasons including failures at the sender or receiving end. Network and powers outages, storage disk issues, and human error all contribute to missing data in the above supply chain. As explained later, the main method to prevent data loss, especially in handoffs, is by resending the file until a valid conformation is recorded on the blockchain, rather than restoring files by other means. In the proposed method, copies of sent files are kept in a sender node until the sender node sees a record on the blockchain that the file has been received properly, and these redundancies are used to recover the data, if needed. Data loss could have serious impact on analytics, e.g., potentially introduce bias into machine learning (ML) or artificial intelligence (AI) applications if the missing data is not randomly occurring.

Figure 2C:
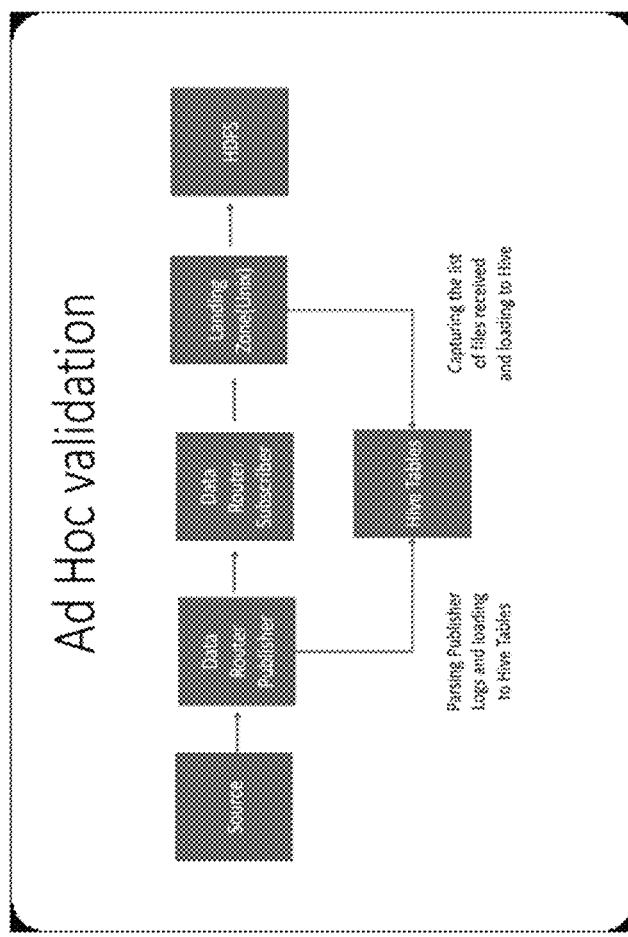
FIG. 2C is a block diagram illustrating an exemplary ad hoc validation of publisher file delivery logs to the files on the subscriber's landing zone to address data completeness issues.
Figure 2B:
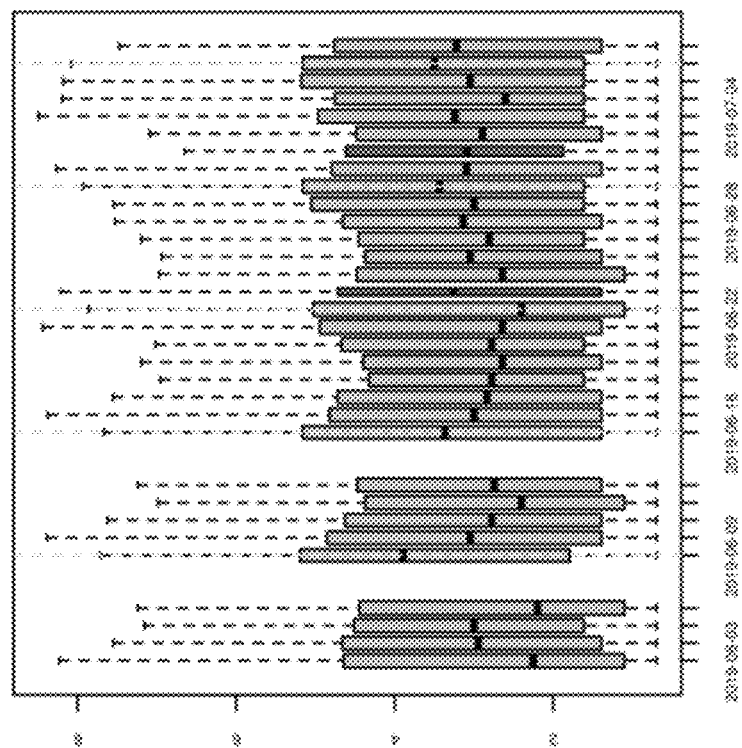
FIG. 2B is a box and whisker graph illustrating a distribution of the number of unique viewers in a television streaming service.

FIG. 2B is a box and whisker graph illustrating a distribution of the number of unique viewers in a television streaming service. As shown in FIG. 2B, the magenta boxes have incomplete data. Note the bias in the first magenta box where the median number of unique viewers (black line in the middle) is higher than normal, which indicates that some of the less viewed providers have not delivered the viewing sessions data.

FIG. 2C is a block diagram illustrating an exemplary ad hoc validation of publisher file delivery logs to the files on the subscriber's landing zone to address data completeness issues. Different applications may attempt to identify missing data in different ways. As illustrated in FIG. 2C, the ad hoc checking system matches the feed manager's file publishing logs with the files found on the landing zone of the subscriber using hive tables.

Figure 2D:
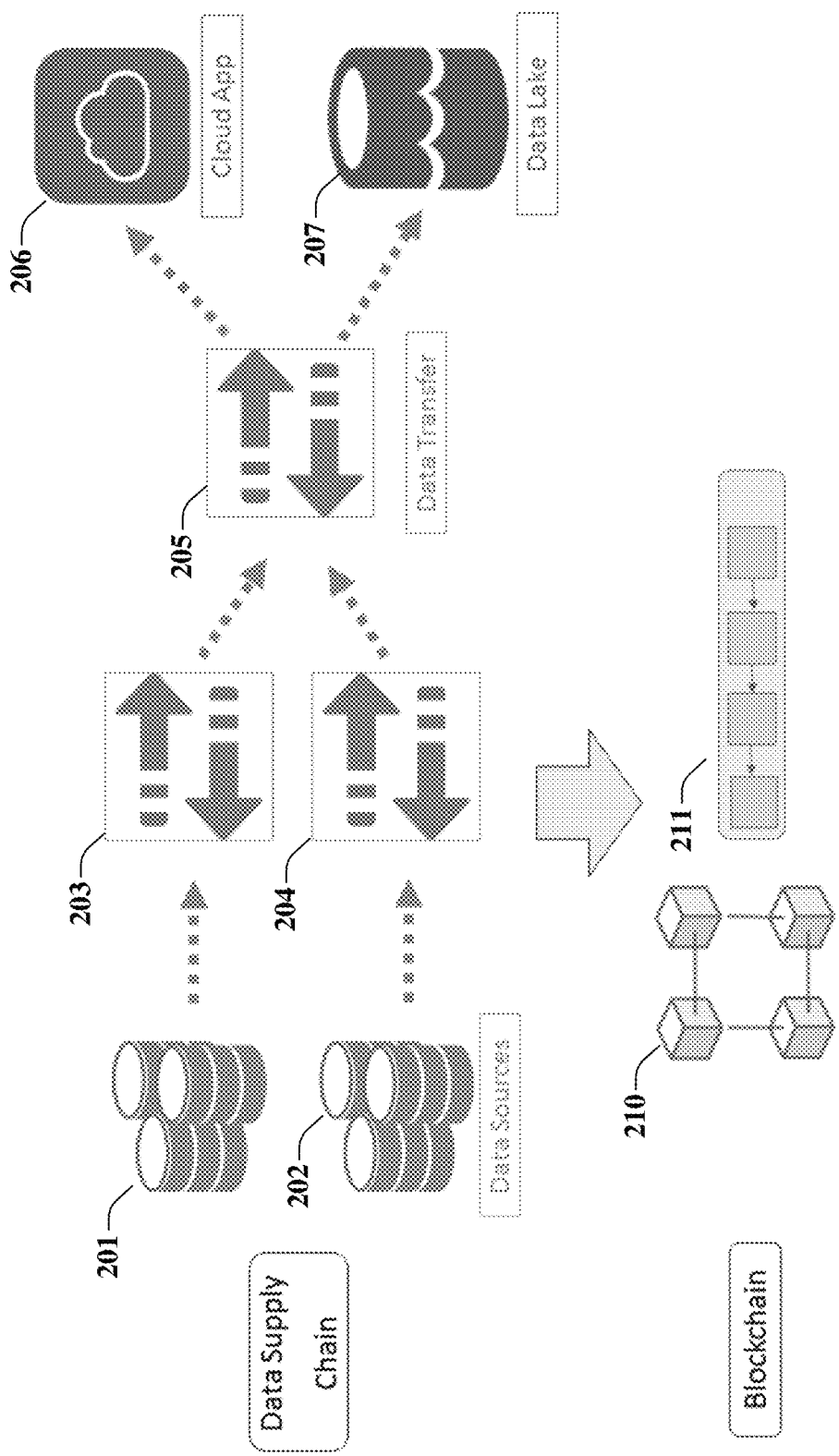
FIG. 2D is a block diagram illustrating an example, non-limiting embodiment of a data supply chain with a blockchain functioning within the communication network of FIG. 1 in accordance with various aspects described herein.

FIG. 2D is a block diagram illustrating an example, non-limiting embodiment of a data supply chain with a blockchain functioning within the communication network of FIG. 1 in accordance with various aspects described herein. As shown in FIG. 2D, system 200 comprises two data source nodes 201, 202, three intermediate nodes 203, 204, 205, a cloud app 206, a data lake 207, blockchain peer nodes 210 and blocks in the shared blockchain 211. Data is transferred from the two data source nodes 201, 202 to the cloud app 206 and the data lake 207 via the three intermediate nodes 203, 204, 205. Each intermediate node could belong to a different organization. All the nodes maintain the shared blockchain 211.

Figure 2E:
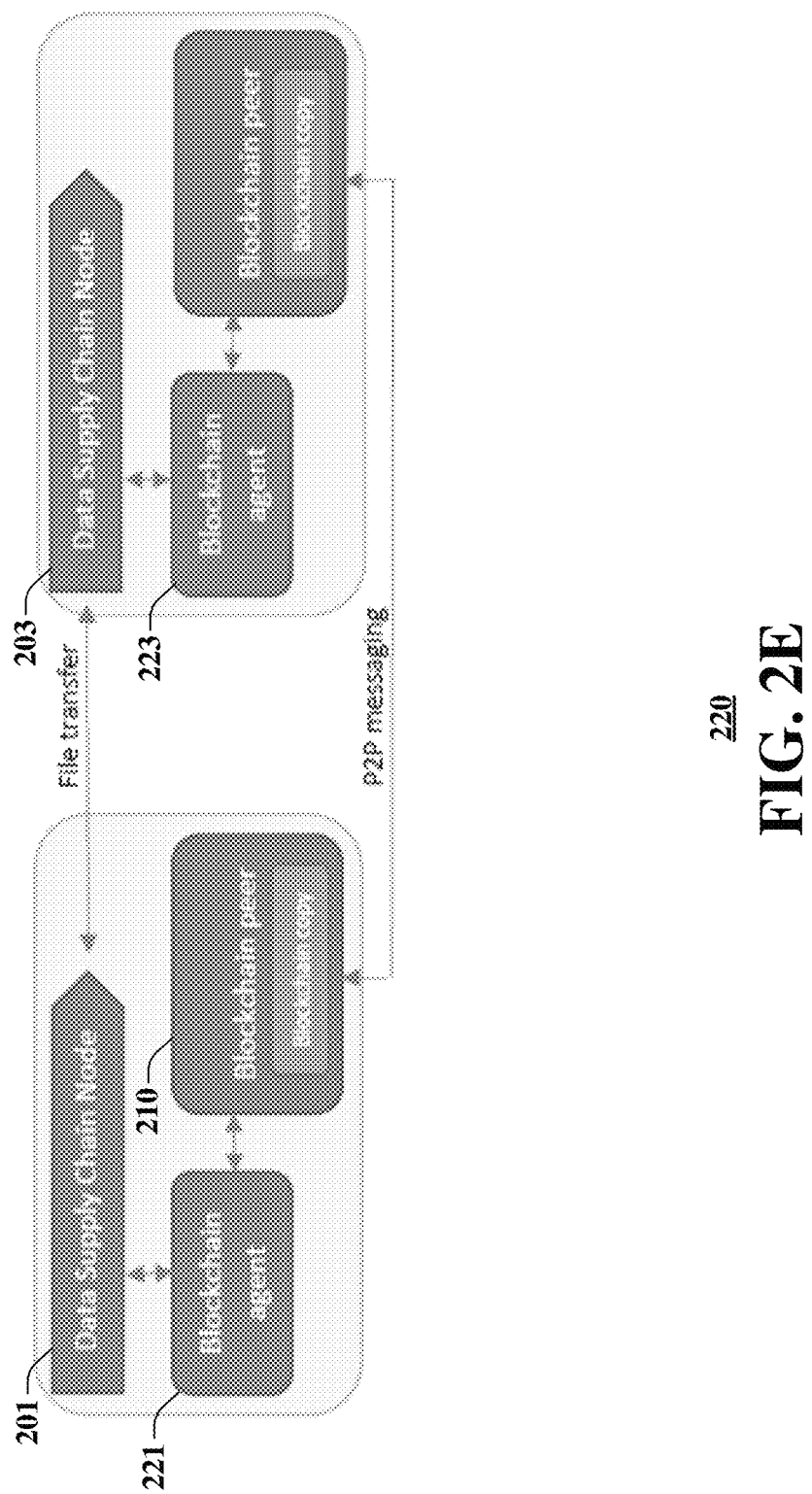
FIG. 2E is a block diagram illustrating an example, non-limiting embodiment of a blockchain agent interacting with a data supply chain and a blockchain peer node functioning within the communication network of FIG. 1 in accordance with various aspects described herein.

FIG. 2E is a block diagram illustrating an example, non-limiting embodiment of a blockchain agent interacting with a data supply chain and a blockchain peer node functioning within the communication network of FIG. 1 in accordance with various aspects described herein. As shown in FIG. 2E, the blockchain peer nodes 210 maintain a copy of the shared blockchain 211 and are part of a peer-to-peer network. Blockchain agents 221, 223 serve as a broker between the data supply chain data source node 201, intermediate node 203 and blockchain peer nodes 210. The blockchain agent 221 provides the functionality of a connection with the shared blockchain 211 and recording transactions, like a wallet application used in cryptocurrencies. The blockchain agent 221, 223 transforms information like a record of the sending of the file and a hash for the file into a common record structure and writes the common record structure on the shared blockchain 211 through the blockchain peers. The blockchain peers exchange messages to maintain their copy of the blockchain. A node of the data supply chain interacts with other nodes of the data supply chain as part of the data supply chain and interacts with the blockchain peer nodes via the blockchain agents 221, 223. The shared blockchain 211 is used to solve some of the issues that occur in a data supply chain.

Data loss often occurs when there is no coordination between two nodes regarding the transfer of files—the nodes do not fully agree on which transfers were completed successfully. Furthermore, when a file is lost, there might be no consensus regarding whether (i) the file was sent properly and has been lost by the receiver or (ii) has never been received. Each node in the data supply chain has its own blockchain agent and each agent has a unique set of private and public keys. The public key can be used for signing messages such that only the owner of the private key can sign the message, but anyone can verify the validity of the signature using the public key to decrypt the message. Using the keys is needed for security and authentication.

Figure 2F:
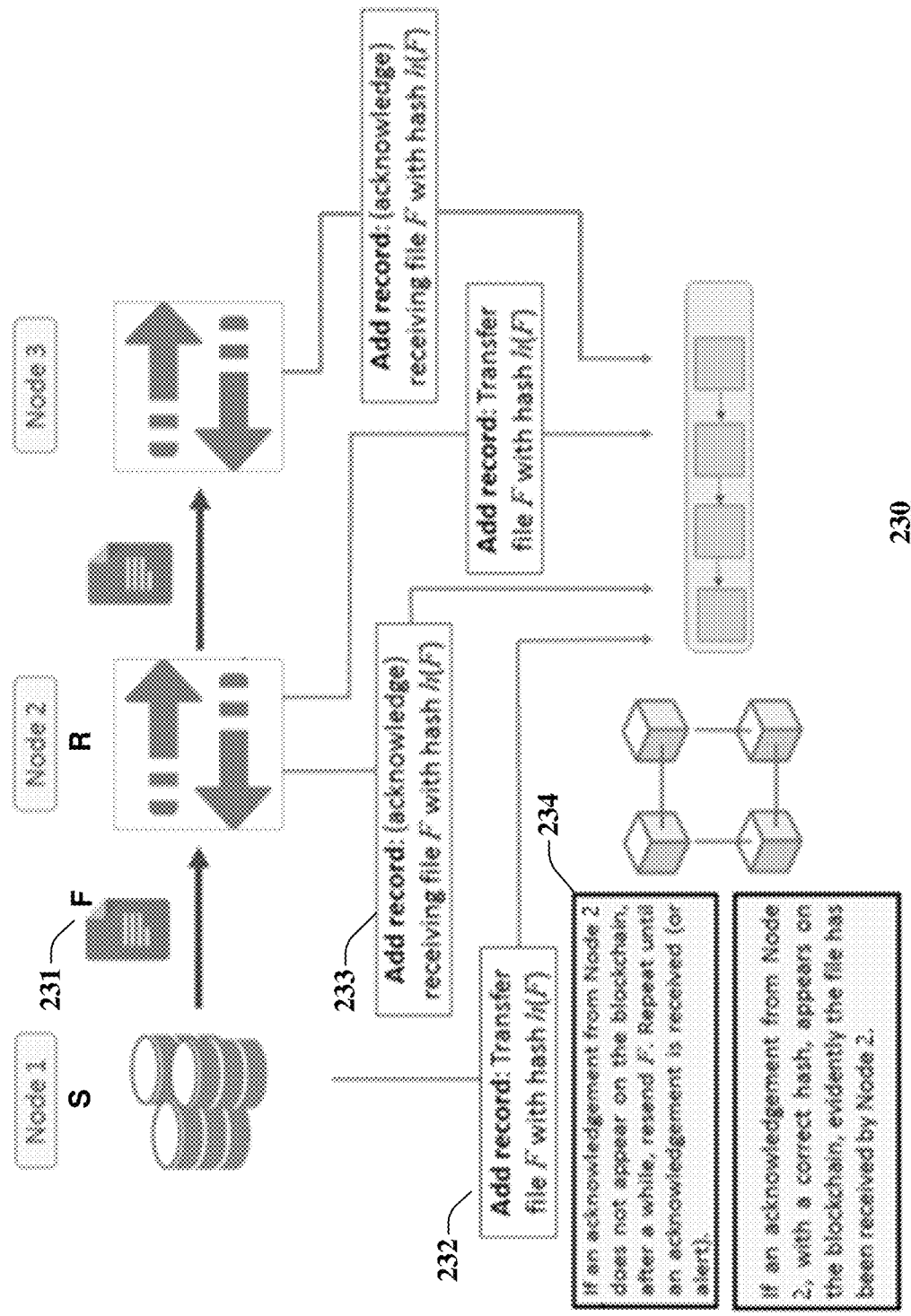
FIG. 2F is a block diagram illustrating an example, non-limiting embodiment of a method of transferring a file in a data supply chain using a blockchain.

FIG. 2F is a block diagram illustrating an example, non-limiting embodiment of a method of transferring a file in a data supply chain using a blockchain. As shown in FIG. 2F, method 230 illustrates an example of recording file transfers and acknowledgements on a blockchain. The blockchain is not used for data transfer, but rather for recording of control information. Hence, the blockchain does not become the bottleneck and does not cause a delay in the transfer of files—first, files are transferred, and then, records are added to the blockchain, so the records on the blockchain do not affect the latency of the file transfer of a file F from a sender node S to a receiver node R. The steps of method 230 are:

In step 231, S sends file F to R.

Next, in step 232, S adds to the blockchain a signed record <send, S, R, t, f-id, h(F), sign($K_S$, [t, f-id, h(F)])> where t is a timestamp, f-id is the file identifier, h(F) is the hash of the file and sign($K_S$, [t, f-id, h(F)]) is a signature of the timestamp, file id and hash, using the private key $K_S$ of S.

In step 233, when R receives the file F, R verifies that the hash of the received file h(F) matches the hash value recorded on the blockchain, and that the signature of S is proper. If all is valid, R adds a record to the blockchain that indicates receipt of the file <receive, R, t', f-id, h(F), sign ($K_R$, [t', f-id, h(F)])>. The added record is signed using $K_R$, the private key of R and can be verified using the public key of R. If the hash or the signature are invalid, R sends a message to S that the received file is invalid and then discards this file.

Alternatively, in step 234, until there is a valid signature on the blockchain indicating receipt of the file F, S continues trying to send the file to R. After a certain number of failed attempts or expiration of a time period, an alert may be issued. The predetermined time between transfer attempts and the number of attempts before alerting could be configured. Note that S does not delete file F before receiving a confirmation that the transfer has been successful.

Optionally, in step 235 (not shown), if S needs to transfer a file to several nodes, S needs to receive a signed confirmation recorded on the blockchain from each one of the recipients.

If a file F is lost there are two cases. In the first case, where there is a valid signature of R recorded on the blockchain, with the valid hash of F. In such a case, clearly R received the file because R was able to compute a correct hash value and sign it. Node S does not have the private key of R and cannot fake the signature of R on the blockchain. In the second case, if there is no record of receiving the file on the blockchain, then S is still responsible for the delivery of the file and has failed to do so. Note that the blockchain is tamper proof, so it is impossible that a signed confirmation has been recorded and then deleted.

If there are just two nodes in the data supply chain, then a signed message exchange is enough to prove transfer, because a node can prove what the other node has done by showing the signed message exchange. But when there are more than two nodes in the data supply chain, a simple exchange of signed messages is insufficient. To illustrate this, consider three nodes n1, n2, and n3 of the data supply chain. Suppose that a file F was sent from node n1 to node n3 through node n2. If the file is lost, there is a need to collect signed messages from all the nodes to discover the point of failure, but such an approach may fail if not all the nodes provided the information—nodes could be down (unavailable), untrusted, may not keep information that is needed for such an analysis, deliberately or by error, etc. So, if node n1 has a signed message from n2 of successfully delivering the file and there is no additional information from the other nodes, it would be impossible to know if the failure occurred in node n2, in the delivery from n2 to n3, or in node n3. When recording messages on a blockchain, however, all the information for such an analysis is stored on the blockchain and available to all the nodes and even to third parties, independent of the status of the data transfer nodes.

Figure 2H:
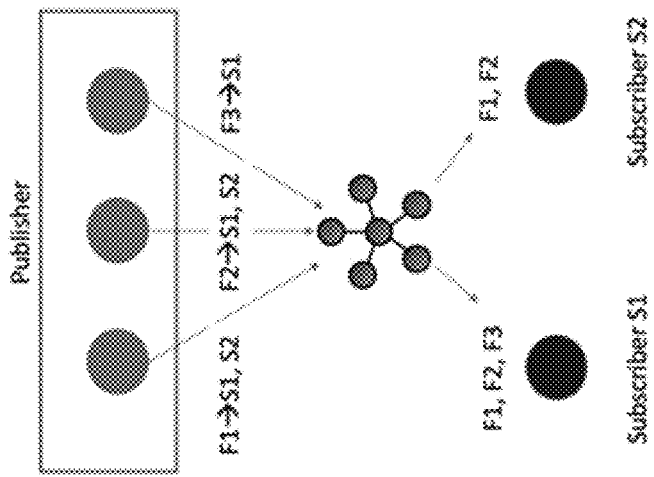
FIG. 2H is a block diagram illustrating an exemplary partial data transfer in a data supply chain.
Figure 2G:
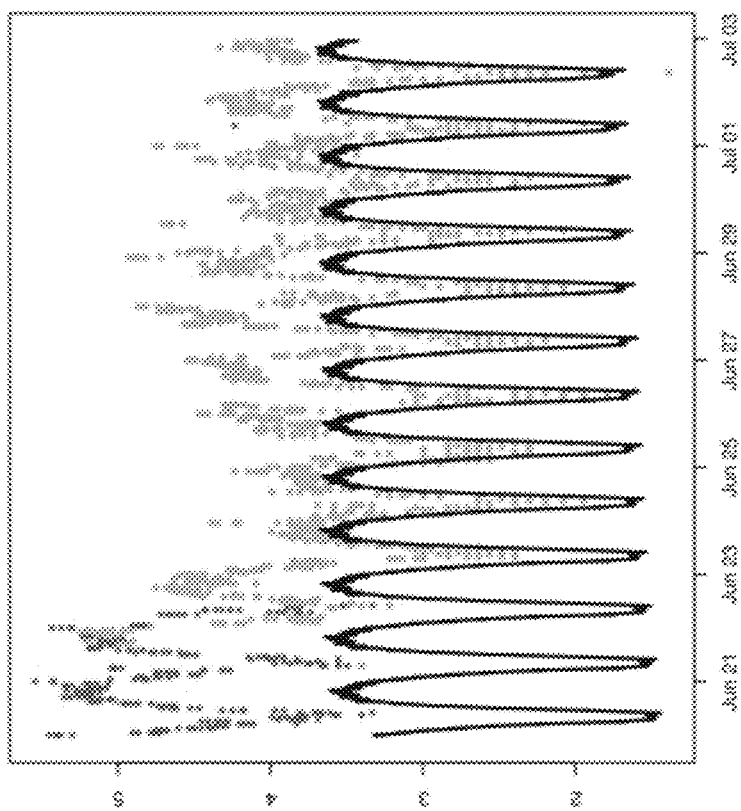
FIG. 2G is a graph illustrating a statistical effect of data duplication in a data supply chain.

FIG. 2G is a graph illustrating a statistical effect of data duplication in a data supply chain. In data duplication, a file might be re-sent multiple times, in error, resulting in duplicate files that are often propagated along the data supply chain. FIG. 2G illustrates an instance of duplicate transmission in the supply chain that results in a temporary biasing of statistical models toward higher values caused by undetected near duplicates, deviating from the normal diurnal variation. The same file could be sent more than once between two nodes, e.g., if a node is not sure whether the following node in the chain received a file, it might resend the file, to prevent file loss. Not handling this case with care may lead to duplications of files.

Using a blockchain helps recording and tracking cases where files are resent. A receiving node can see on the blockchain the files that are sent to it, detect duplications, and check that all the hashes of resent files are similar. It may use the first valid copy, acknowledge receiving it, by recording the acknowledgment on the blockchain, and discard the other copies. Note that by having the hashes of files recorded on the blockchain, cases where the same file identifier is resent with different file content can be easily detected and an alert can be raised.

FIG. 2H is a block diagram illustrating an exemplary partial data transfer in a data supply chain. Very large files could be transferred in chunks, e.g., using hypertext transfer protocol (HTTP) 1.1. The approach of chunked transfer encoding, where parts of files are sent independently, is practical and often used in transfer of large files. However, when this approach is applied, parts of files may be missing or duplicated in the transfer. When parts of a file are sent independently, it is possible that only some of the parts will arrive at the receiver node. Partial data transfer shown in FIG. 2E was caused by a subset of servers in a sender's cluster failing to recognize a new subscriber. The receiver could determine exactly what was missing only after a lengthy manual trace-back involving multiple people and organizations.

A straightforward solution to this is to have the file parts numbered, consider the pair of file id and part number as the id of the chunk, and refer to each chunk as a separate file. The problem with this approach is that the receiving node may still not know whether all the chunks where sent— when to continue waiting for additional chunks and when to refer to all the submitted chunks as a complete file. There are two solutions to such a problem.

First, with reference to FIG. 2F, consider the case where the file F and the number of chunks n are known to S before it starts sending the chunks. In such a case, S writes on the blockchain a record <chunked-transfer, S, R, t, f-id, h(F), n, sign($K_S$, [t, f-id, h(F), n])> that marks the start of the chunked transfer encoding. R now knows that it should wait for n chunks of file F. Each transfer of chunk C is also recorded on the blockchain <chunk-send, S, R, t, f-id, i, h(C), sign($K_S$, [t, f-id, i, h(C)])>, where C is the transferred chunk and i is the chunk number in the partition of F into chunks. For each received chunk, the receiving node R acknowledges receiving the chunk by recording on the blockchain <chunk-received, R, t', f-id, i, h(C), sign($K_R$, [t', f-id, i, h(C)])>. When all the n chunks are received, R adds to the blockchain an acceptance acknowledgement <receive, R, t', f-id, h(F), sign($K_R$, [t', f-id, h(F)])>. In such a case, the entire file is guaranteed sent and received properly.

Second, consider the case where the size of file F is unknown to the sending node S. This may happen, for instance, when the file is received from a data streaming application. In such a case, the end of the transfer could be an empty chunk or some other agreed message. Initially, the file-transfer initiation is recorded <chunked-transfer, S, R, t, f-id, sign($K_S$, [t, f-id])>, followed by send and received records <chunk-send, S, R, t, f-id, i, h(C), sign($K_S$, [t, f-id, h(C)])> and <chunk-received, R, t', f-id, i, h(C), sign($K_R$, [t', f-id, i, h(C)])> like in the first place. The end of the transfer is declared by recording on the blockchain <chunked-transfer-end, S, R, t, f-id, h(F), n, sign($K_S$, [t, f-id, h(F), n])>, and an acknowledgement by the receiving node <chunked-transfer-end-ack, R, t', f-id, h(F), n, sign($K_R$, [t', f-id, h(F), n])> to acknowledge receiving n chunks which constitute the entire file F.

By recording the transfer of chunks on the blockchain and by signing the hash values of the chunks and the file itself, in a failure to deliver the file completely, the cause of the problem can be traced back. When parts of a file are missing, it is easy to see which parts are missing and whether they were sent and received, sent and not received, or never been sent. Furthermore, when the transfer is through several nodes, transfer failures may occur in different nodes, and the records on the blockchain would allow any node to see which nodes should resend which parts.

Figure 2I:
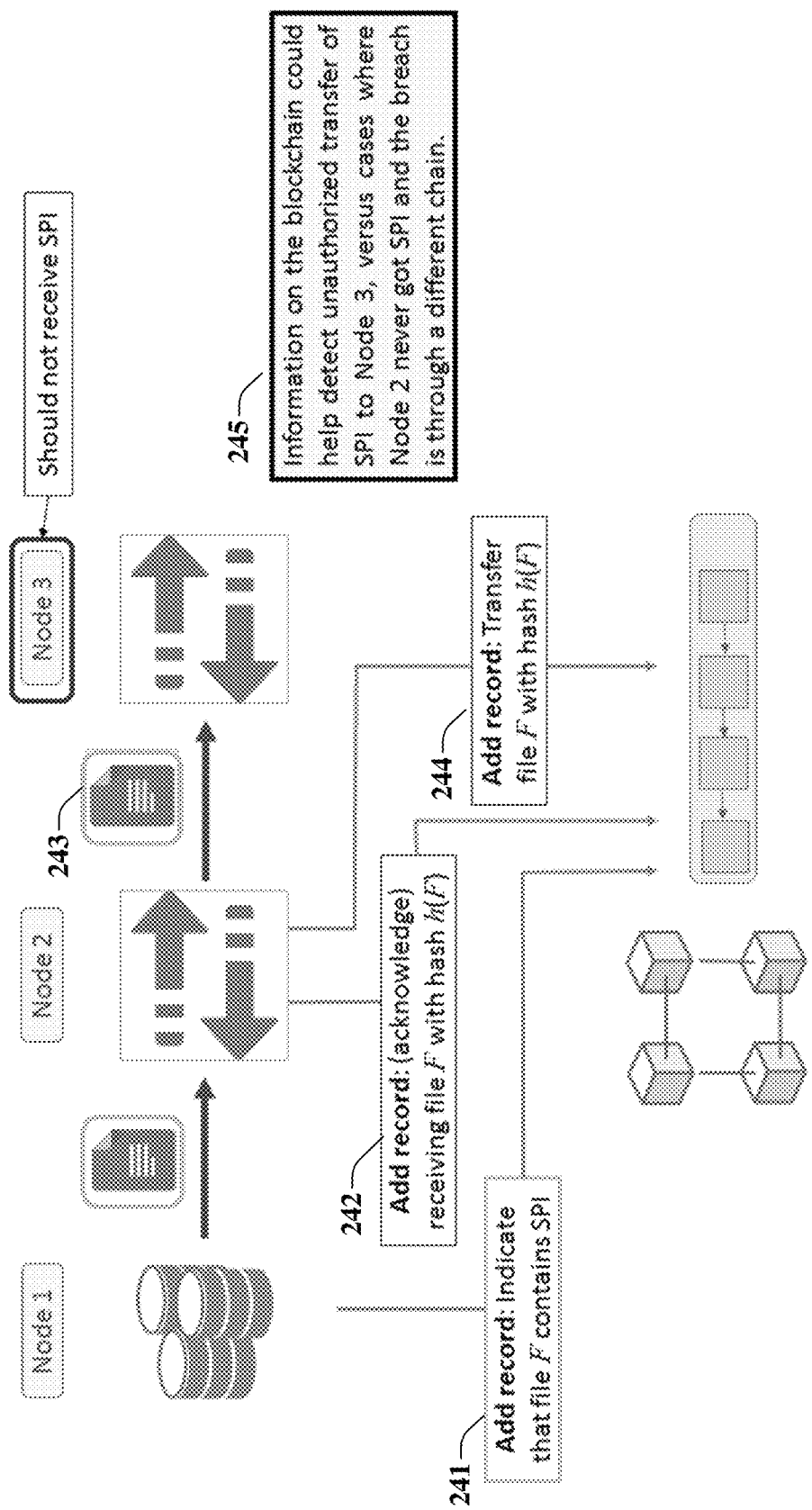
FIG. 2I is a block diagram illustrating an example, non-limiting embodiment of a method of marking a file containing Sensitive Personal Information (SPI) in a data supply chain using a blockchain in accordance with various aspects described herein.

FIG. 2I is a block diagram illustrating an exemplary embodiment of a method of marking a file containing Sensitive Personal Information (SPI) in a data supply chain using a blockchain. SPI refers to information that does not identify an individual, but is related to an individual, and communicates information that is private or could potentially harm an individual should it be made public. Files transferred in violation of SPI or General Data Protection Regulations (GDPR) should not be accepted for transfer by the data supply chain. Files may contain sensitive information that should not be sent to certain other nodes, e.g., avoid sending SPI to servers of other companies. Clearly, there is a need to prevent privacy and security breaches. But even when a breach occurs, having the information on a tamper-proof ledger could help analyze the case to prevent future breaches. Suppose that Node 1 adds a record 241 to indicate that file F contains SPI. Next, a node (Node 2) that is not malicious receives the file F and adds a record 242 acknowledging receipt. Then Node 2 erroneously sends the file 243 with SPI to a node that should not receive SPI (Node 3) but records the transfer in a record 244.

The use of blockchain makes the process transparent and increases the chances of detecting the issue early. Node 1 can examine the blockchain 245 to detect the unauthorized transfer of SPI to Node 3. Without transparency, when each node only has local information about files, Node 1 may not be aware that SPI files were transferred to Node 3, and the error in Node 2 may only be discovered late, after causing a lot of damage.

Generally, a transfer constraint could be defined with respect to the file content, the receiving node or the context. For example, the context could be the time of the day to prevent file transfer after business hours. Each constraint has a unique id. The transfer constraints can be stored on a specific blockchain instance, that is, a chain of blocks different from the one used for the storage of the transfer transactions. This approach provides a storage of the active constraints in a transparent and tamper-proof way.

Constraints that depend on the context could be satisfied when the context changes. Such constraints should include a maximum wait limit, in order not to examine the context indefinitely. The sending node should wait and check the constraint satisfaction within the period defined by the maximum wait limit. If the constraint is satisfied, the file should be sent to the receiving node. For example, an order constraint may not be satisfied right away but would be satisfied after the arrival of additional files, however, if the delay is too long, it may be irrelevant to transfer the delayed file.

When a node receives a file that it cannot deliver, it should record on the blockchain a no-transfer transaction with the file details and the constraint id. This would allow an audit, to find cases where the transfer constraints where properly applied to file-transfer transactions and detect cases where unauthorized file transfers occurred.

To define transfer constrains, we use a NO TRANSFER WHERE condition WAIT wait-limit statement, e.g.:
NO TRANSFER WHERE contains-spi(FILE) AND external(RECEIVER) WAIT 10;
The constraint can relate to predefined variables like the transferred file, the receiving node, and contextual variables. Functions that test properties of these variables can be implemented and used.

Another data issue includes out-of-order data that arrive late. When files should be transferred in an order, the order can be specific to particular files. For example, file $f_1$ should be received by R before sending file $f_2$ from S to R, or there could be general rules that define an order, e.g., a file that records the selling of stocks to buyer B should be transferred before a file that records the transaction of B selling these stocks. The first case is an instance of the second case.

Order rules can be recorded on the blockchain or be encoded in the system, e.g., in a cryptocurrency like Bitcoin. A transaction of transferring coins can only be recorded after receiving these coins, and this rule is an integral part of the system.

Order constraints can use predicates, that is, conditions over file-transfer transactions that are recorded on the blockchain. An order constraint has the form $P_1(T_1, x) \rightarrow P_2(T_2, x)$, where $P_1$, $P_2$ are predicates, $T_1$, $T_2$ are transactions and x is a variable. When transaction $T_2$ satisfies $P_2$ for an assignment to x, if should be executed and recorded on the blockchain only after execution and recording of transaction $T_1$ that satisfies $P_1$ for an assignment to x.

In a trivial case, without an assignment to x, is when file $f_2$ should be transferred after file $f_1$. In such a case, the condition $P_2$ is f-id="$f_2$," and the condition $P_1$ is f-id="$f_1$." The sender node S should only send to R file $f_2$ after seeing on the blockchain a signed acknowledgement that file $f_1$ has been received by R.

As an example of a more intricate order constraint, consider a case where files represent submission and approval of requests, and each request has a unique request id. An order constraint could limit an 'approval file' of a request to only be sent and recorded after the corresponding 'submission file'. In this case, the condition in $P_2$ is that the file is of type 'approval,' $P_1$ requires that the file would be of type 'submission,' and x is the request id.

To enforce order constraints, for every record of sending or receiving a file with an order constraint applied to it (that is, the file satisfies $P_2$ for some order constraint $P_1(x) \rightarrow P_2(x)$), the constraint is tested and its id is included in the 'send' and 'receive' records on the blockchain, as part of the signed message. A node that signs the constraint declares that the constraint has been tested and passed the test. In such a case, if files were arrived out of order, it is easy to detect cases where the order constraint has not been tested by a node or has been tested incorrectly, to prevent future errors, or correct the order of the files in downstream nodes.

To define order constraints, we use for the conditions a syntax like WHERE clauses of SQL:

```
TRANSACTION t-variable-1
WHERE condition-1
AFTER
TRANSACTION t-variable-2
WHERE condition-2
For example
TRANSACTION T1 WHERE
T1.file LIKE '%approve%'
AFTER
TRANSACTION T2 WHERE
T2.file LIKE '%submit%'
AND T2.request_id = T1.request_id;
```

Another data issue is verification of quality of data, where unverified files should not be accepted by nodes while at the same time, tests, once performed should not be replicated by nodes downstream. Validation procedures are often necessary to guarantee security, privacy, compliance with company regulations and data quality. Validation may be needed to test that files do not contain malicious software, sensitive information, duplicates, etc. The tests could be done in different nodes. But it is important to share the information that tests were executed in a trusted way, to prevent executing the same test several times or skipping essential validation or data quality tests.

Let V be a validation test, like scanning for viruses. When a node S applies this test for a file F with id f-id, it should record on the blockchain <validation, S, v-type, f-id, h(F), sign($K_S$, [f-id, v-type, h(F)])> where the validation type v-type indicates the type of the validation V. A node that receives the file F can verify that the hash h(F) is the same as that of the tested file, so the validation is still applicable.

Note that a malicious node without the proper private key would not be able to record on the blockchain a fake validation of a different node.

Without using a blockchain, nodes would need to exchange many messages between them, to verify that a particular test has been done, and it will be exceedingly difficult to conduct an audit without a trusted record of the tests that were performed, and their association with the nodes that performed them.

Another data issue is validating the legitimacy and accuracy of stated file transformations and manipulation. Nodes in a data supply chain may transform and manipulate files. There is a need to verify that manipulations are only executed when needed and in a proper way.

One case to consider is when a node erroneously or maliciously changes a file when it should only transfer the file. Since the hash of files are recorded and signed by the transferring nodes, it is easy to verify that a node does not change a file unnecessarily.

Another problematic case is when a node should send the same file to several following nodes but sends different files to different nodes. Such a case can be easily detected by comparing the hash values of the files. Note that with a blockchain, the detection does not require trusting any specific node that would compare the hashes. Any node can verify that such a case does not occur. If a mismatch is detected, the receiving node should refuse accepting the file and report an error.

A third case is when a node needs to change a file—apply a transformation, create a file by merging other files, partition a file, etc. In such a case, the received files are different from the transferred files, so comparing the hash values before the change with hash values after the change is not a good method to verify that the change has been conducted properly. Instead, we suggest an approach that is based on redundancy and majority. The node that applies the change is replicated. Each replica computes the same function, and a result that is produced by most of the nodes is selected by the following nodes in the supply chain. Note that only a single transformation can be the one executed by most of the nodes. To make this process trustworthy, the replicas are machines that belong to different organizations.

Suppose that a node S applies function g(F) to files F and provides the result to R. To increase trust, in the correctness of the transformation, there are k "copies" of S, that is, k nodes $S_1, \ldots, S_k$. The input of S is becoming the input of $S_1, \ldots, S_k$. For a given file F, the nodes $S_1, \ldots, S_k$ compute g(F) independently, send the result to R and record the hash of the result on the blockchain, <send, $S_i$, R, $t_i$, f-id, h(g(F)), sign($K_{Si}$, [$t_i$, f-id, h(g(F))])>.

Node R receives k values $g_1(F) \ldots g_k(F)$ with hashes $h(g_1(F)) \ldots h(g_k(F))$ computed by the k replicas of S. If there is no majority of hash values, an error is reported. Otherwise, R keeps a result $g_i(F)$ such that the value $h(g_i(F))$ appears at least $\lceil k/2+1 \rceil$ times among $h(g_1(F)) \ldots h(g_k(F))$, that is, this value is the hash of the result that was produced by the majority of the replicas. Node R records on the blockchain just the receiving record of the transformed file $g_i(F)$, received from $S_i$, i.e., the selected result. Since a transformation computed by most of the nodes is selected, even if a minority of the nodes are malicious or malfunction and compute an incorrect transformation, these incorrect transformations will not be selected by R.

The entire process, including the sent results, the hash function and the selected transformation are all recorded on the blockchain so they are transparent and could be subjected to an audit. Furthermore, it is possible to record the code of the transformation g(F) on the blockchain.

Data issues cannot be avoided given the complexity of data processes and systems that underpin the data supply chain. However, it should be possible to engender trust in data, for consumption by downstream applications, through a common, verifiable and transparent understanding of data across organizations by maintaining a common ledger implemented using a blockchain, that is, by having a blockchain-powered data supply chain.

Figure 2J:
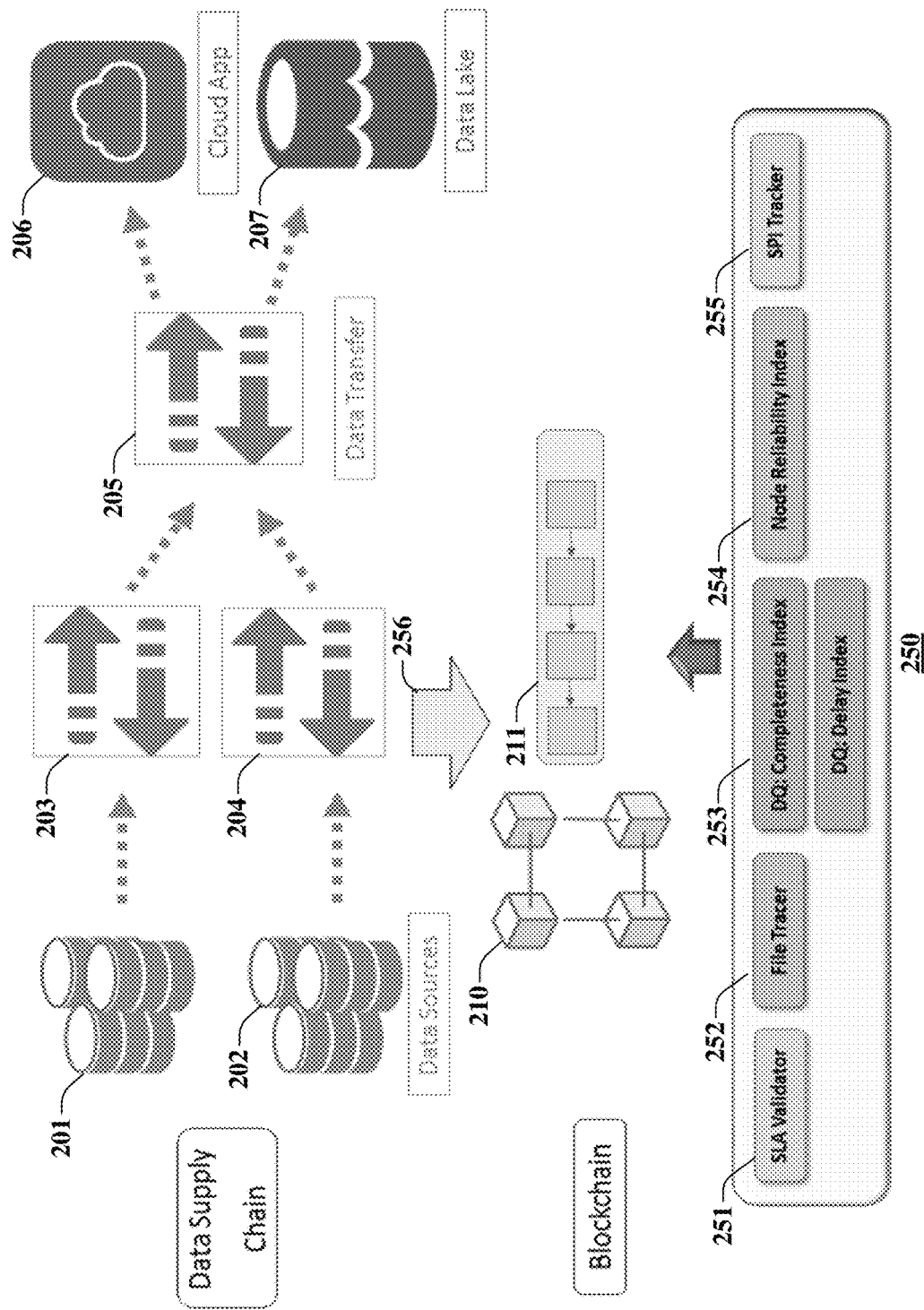
FIG. 2J is a block diagram illustrating an example, non-limiting embodiment of applications that use the data supply chain proof of concept functioning within the communication network of FIG. 1 in accordance with various aspects described herein.

FIG. 2J is a block diagram illustrating an example, non-limiting embodiment of applications that use the data supply chain proof of concept functioning within the communication network of FIG. 1 in accordance with various aspects described herein. To enhance the data supply in FIG. 2J with a blockchain, peer nodes would collect and verify transfer messages from all the participants (two data source nodes 201, 202, intermediate nodes 203, 204, 205 and all the recipients), as shown in FIG. 2J illustrating transactions recorded in a blockchain. For example, after every successful file transfer to an intermediate node succeeded, a data source nodes 201, 202 would send a message (a transaction) to the blockchain network, identifying the file it sent (including file name, size, checksum, and time of transfer). An intermediate node 203, 204, 205, once it has received the file, would validate the data source transaction and write to the blockchain network, and similarly all other components of the supply chain. In FIG. 2J, the block arrow 256 denotes the writing of validated transactions to the blockchain.

Any data source transactions that are not validated within some period would mark the file transfer as failed and the data source would try the data transfer again. Unlike manual, ad hoc mechanisms set up to validate the data router logs against actual files found in the landing zone, the blockchain approach of the exemplary embodiment makes validation systematic: transfers not validated must be retried, to guarantee delivery, and it will be done in a trustworthy way—managed by all the participating organizations. The validating information is also transparently available to all participants, so both data sources, intermediate nodes, routers, and downstream applications, could investigate which transactions failed. Note that the discussion is valid for any data supply chain whether it involves a data router, for example, or a distributed data flow system like NiFi. The value of the blockchain ledger is realized by applications 250 that read the data supply blockchain to serve other needs. For example, as shown in FIG. 2J:

Service Level Agreement (SLA) Validator application 251 reviews the blockchain to determine whether SLAs have been met, e.g., was the file delivered within 24 hours as stipulated.

File Tracer Application 252 traces a file F that was not received by a downstream application and determines where in the data supply chain the hand-off was missed by reviewing the blockchain.

Data Quality (DQ) Indexing Application 253 builds indices, e.g., to determine whether a given data feed (DF) is complete, whether all files in that feed were received within an acceptable amount of delay.

Node Reliability Indexing Application 254 reviews the blockchain and determines whether a node receives and transmits all the files that flow through the node.

SPI Tracker Application 255 reviews the blockchain and checks whether compliance with regulatory requirements, e.g., SPI, are met. This is extremely critical to the business.

In the deployment of the system, each node of the data supply chain would need to have a blockchain agent, but they do not have to be a blockchain peer to add blocks to the chain. About 5-10 peers, based on current blockchain and distributed ledger technologies, should be in the system to avoid a high cost of communication between the nodes and yet have enough redundancy to establish a high level of trust, transparency and availability. For instance, blockchain peers could be maintained by chief officers of an organization, and agents could be distributed throughout the organization. Note that the number of blockchain peers could change in the future, if blockchain technology changes.

A generic solution for trusted data distribution that can be deployed as an extension of any existing data supply chain. In an embodiment, supply chains that use Apache Kafka, Apache NiFi and other data distribution tools can interface with the extension. The suggested approach provides end-to-end transparency and not just monitoring individual nodes. While in a chain any node could be a single point of failure (SPOF), a decentralized ledger such as blockchain could be trusted by not having any SPOF. Recording the transfer-control information enables tracking of data streams with high velocity and volume. While a Write Ahead Logging (WAL) adapted in systems like Apache NiFi could increase the latency, in an embodiment, transfers can be recorded after sending the files, without delaying file transfers at all. To prevent file loss, only when a confirmation of a successful transfer is recorded on the blockchain, the sender can remove the file from its cache.

In an embodiment, Hyperledger Fabric is used for the blockchain system. Hyperledger Fabric has a transaction rate of thousands of transactions per second and a latency of less than one second. Furthermore, blockchain records could relate to aggregated values, so that the number of records on the blockchain would be much smaller than the number of files transferred through the data supply chain.

In an embodiment, the transfers include a bundled file. At some point, the contents of this file will need to get unpacked to be processed. The processing may involve splitting these records by type of service, binning the records by time/day and summing them up in various ways. A replication and majority selection approach would make these processes trustworthy as well. Overall, the use of blockchain has the potential to make data processing trustworthy and could mitigate a variety of data quality issues like missing, corrupted or duplicated data in a data supply chain. This would help guaranteeing trustworthy end-to-end data transfer and delivery through a data supply chain.

While for purposes of simplicity of explanation, the respective processes are shown and described as a series of blocks in FIGS. 2D, 2E, 2F, 2I and 2J, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
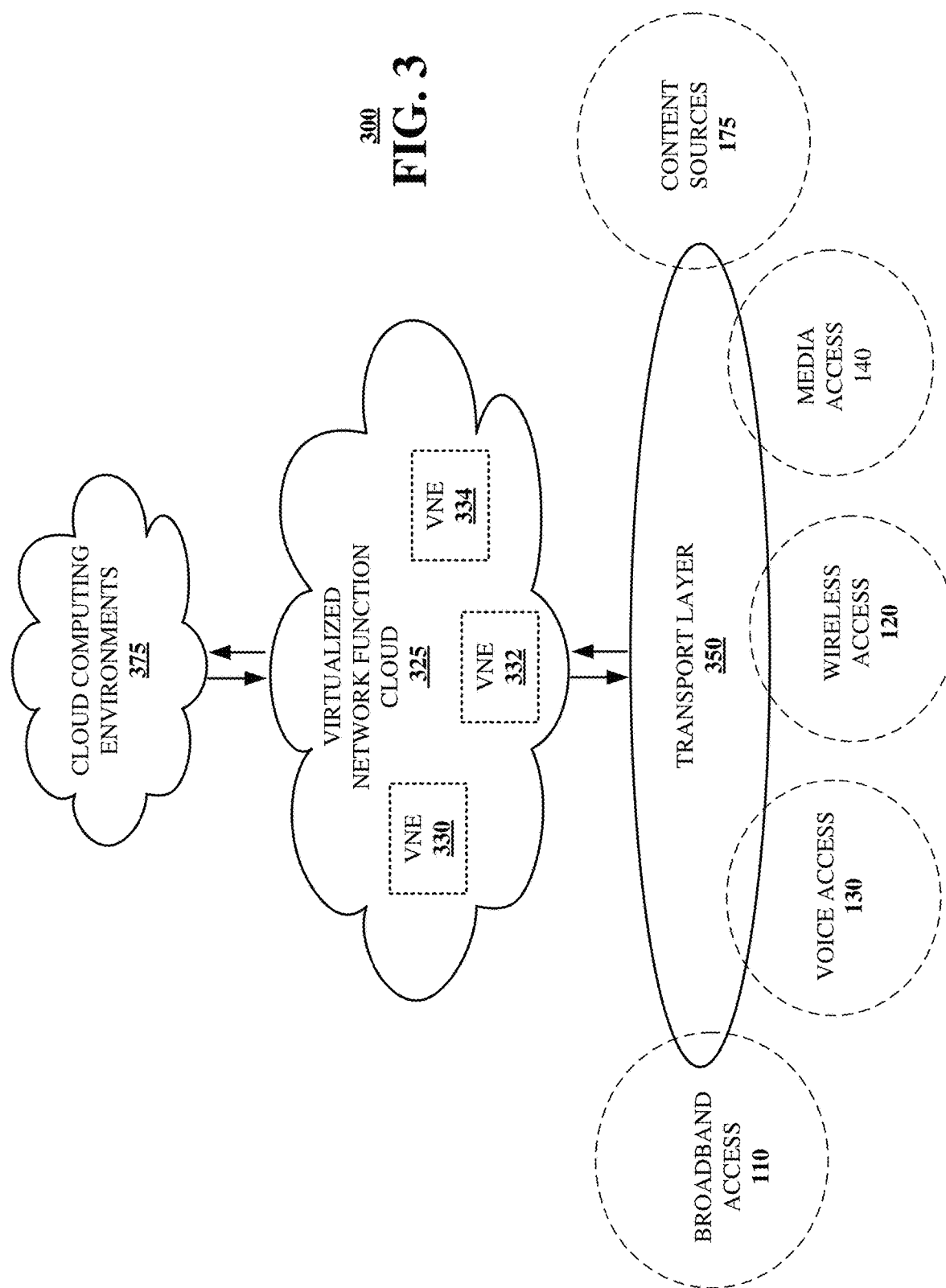
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. A virtualized communication network is presented that can be used to implement some or all the subsystems and functions of communication network 100, the subsystems and functions of system 200, and methods 220, 230, 240 and 250 presented in FIGS. 1, 2E, 2F, 2I, 2J and 3. For example, virtualized communication network 300 can facilitate in whole or in part sending a file to a receiver; sending a record of the sending of the file and a hash for the file to a blockchain agent for recording the record on a blockchain; receiving records of sending a file and a hash for the file from a sender of the file; recording records on a blockchain; providing records to a receiver of the file; and sending a record of the receiving the file and the hash for the file to a blockchain agent for recording on a blockchain.

A cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In some cases, a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across several servers—each of which adds a portion of the capability, and overall, which creates an elastic function with higher availability than its former monolithic version. These virtual network elements 330, 332, 334, etc. can be instantiated and managed using an orchestration approach like those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. Network workloads may have applications distributed across the virtualized network function cloud 325 and cloud computing environment 375 and in the commercial cloud or might simply orchestrate workloads supported entirely in NFV infrastructure from these third-party locations.

Figure 4:
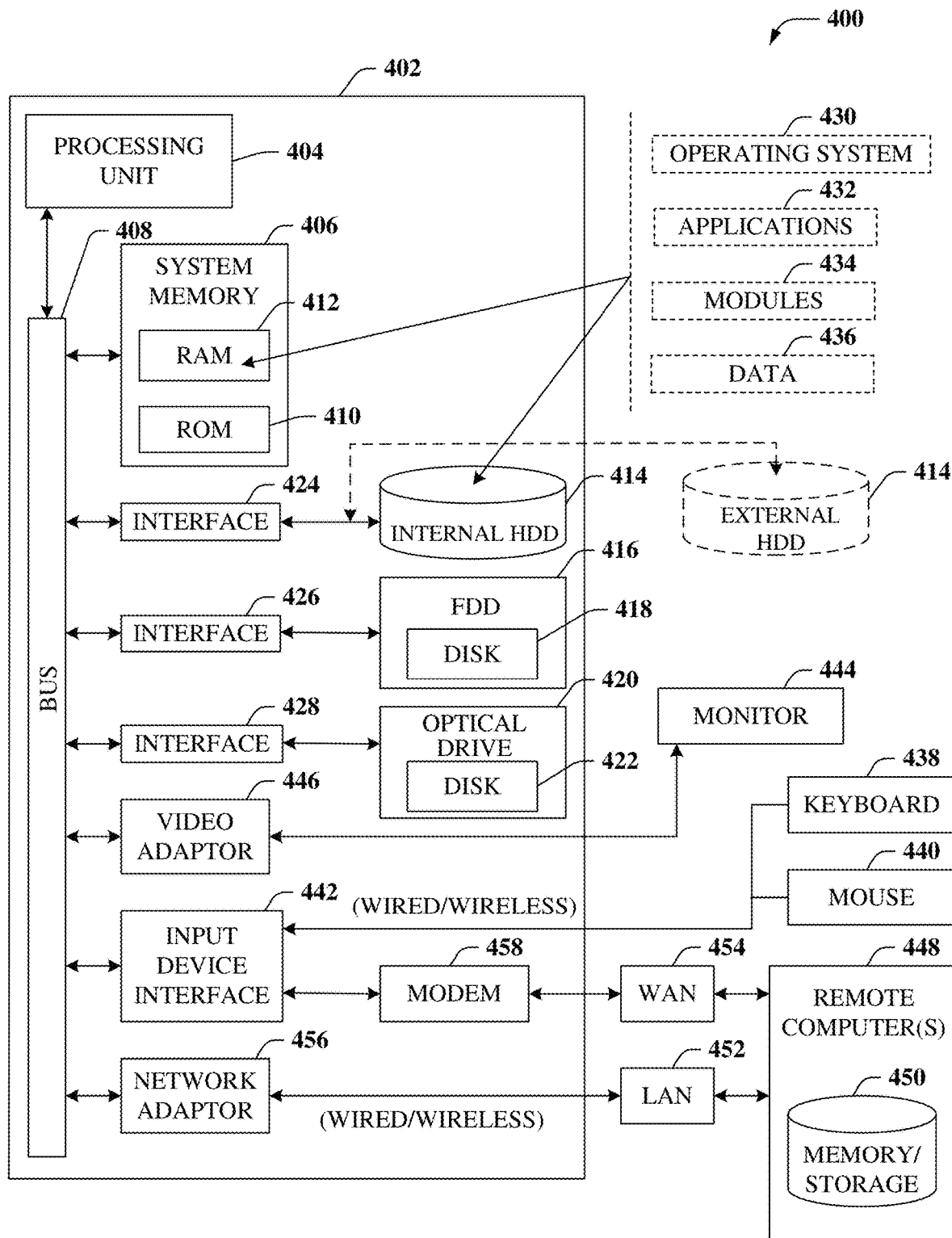
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. Computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part sending a file to a receiver; sending a record of the sending of the file and a hash for the file to a blockchain agent for recording the record on a blockchain; receiving records of sending a file and a hash for the file from a sender of the file; recording records on a blockchain; providing records to a receiver of the file; and sending a record of the receiving the file and the hash for the file to a blockchain agent for recording on a blockchain.

Generally, program modules comprise routines, programs, components, data structures, etc., that perform tasks or implement abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A few program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology like that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance like the basic 10BaseT wired Ethernet networks used in many offices.

Figure 5:
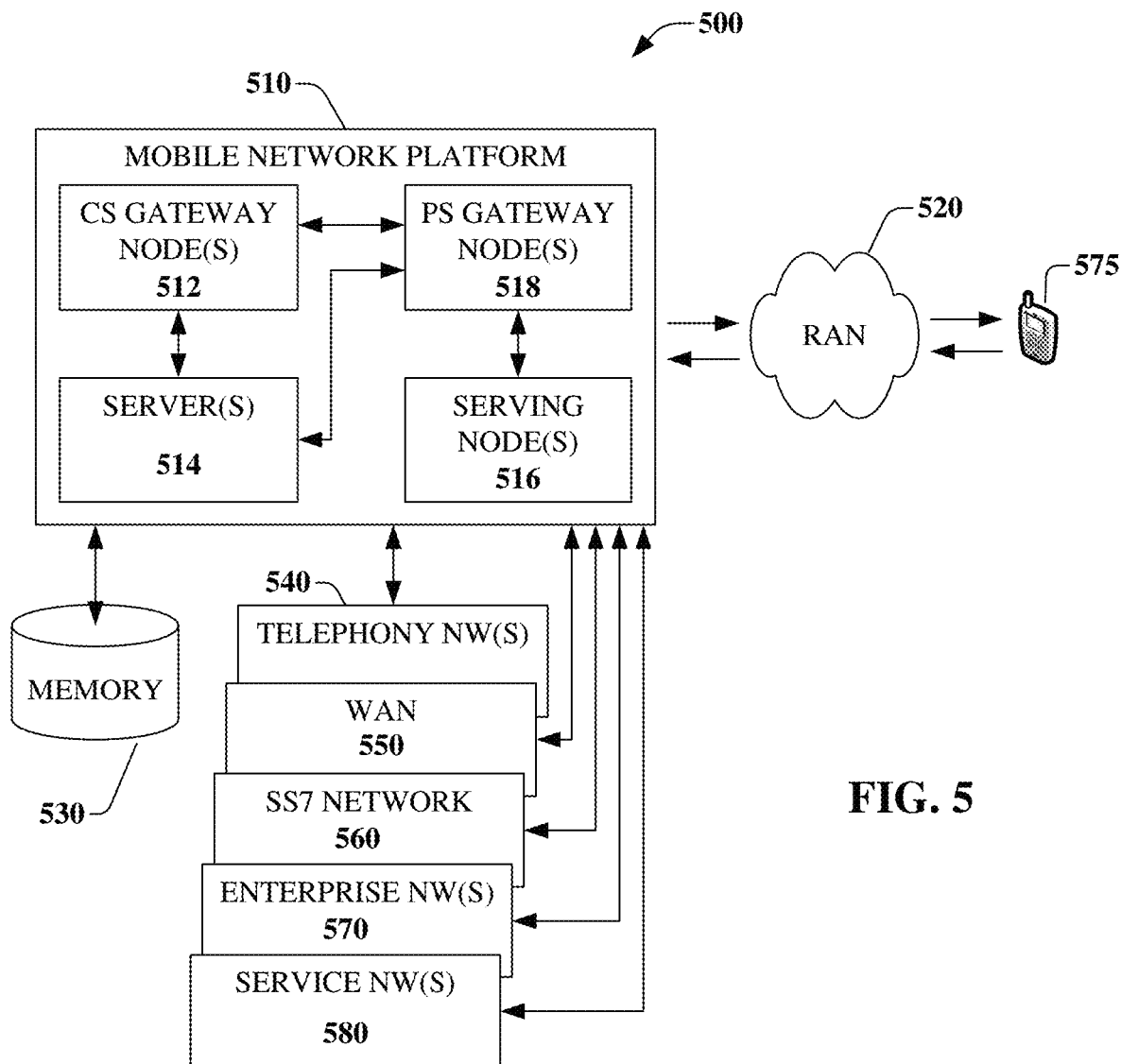
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in sending a file to a receiver; sending a record of the sending of the file and a hash for the file to a blockchain agent for recording the record on a blockchain; receiving records of sending a file and a hash for the file from a sender of the file; recording records on a blockchain; providing records to a receiver of the file; and sending a record of the receiving the file and the hash for the file to a blockchain agent for recording on a blockchain. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1($s$) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform tasks and/or implement abstract data types.

Figure 6:
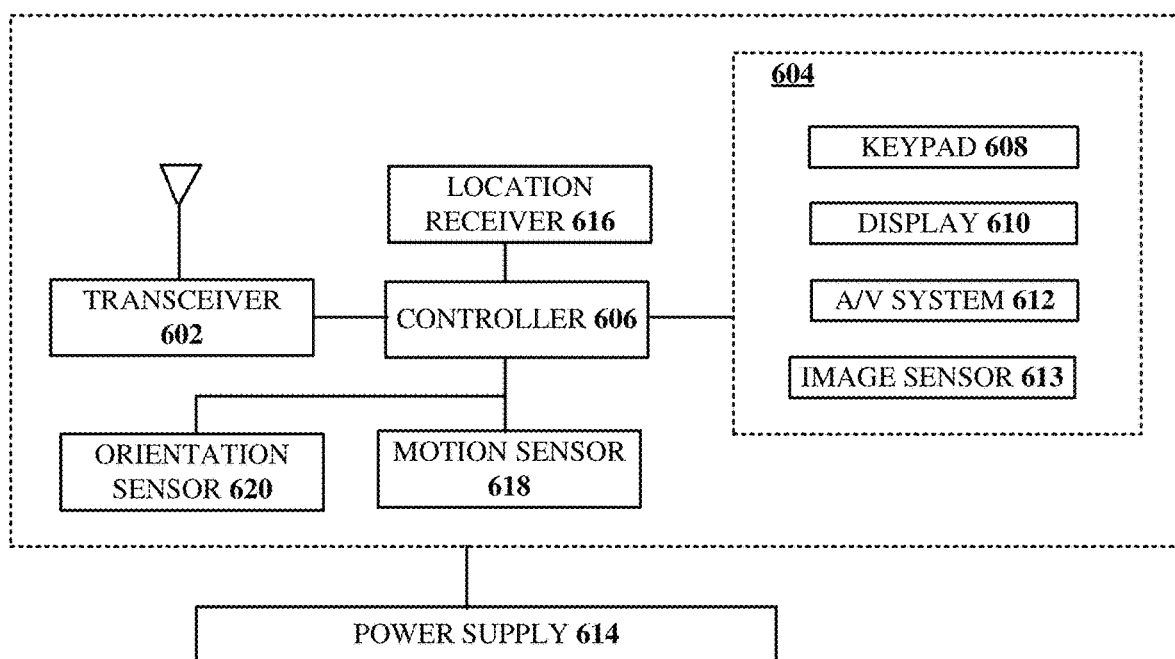
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part sending a file to a receiver; sending a record of the sending of the file and a hash for the file to a blockchain agent for recording the record on a blockchain; receiving records of sending a file and a hash for the file from a sender of the file; recording records on a blockchain; providing records to a receiver of the file; and sending a record of the receiving the file and the hash for the file to a blockchain agent for recording on a blockchain.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=confidence(class)$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. Yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates an ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   providing, to a receiver of a file, a first record of sending the file and a hash for the file by a sender of the file, wherein the first record is recorded on a blockchain;
   monitoring a predetermined time period in which to receive a second record of receiving the file and the hash for the file by the receiver; and
   sending an alert responsive to the predetermined time period expiring without receiving the second record.

2. The device of claim 1, wherein the first record includes a first identifier for the sender, a second identifier for the receiver, a first timestamp, a file identifier, or a combination thereof.

3. The device of claim 2, wherein the first record includes first information in the first record that is signed with a first private key of the sender.

4. The device of claim 3, wherein the first information comprises the first timestamp, the file identifier, and the hash for the file.

5. The device of claim 3, wherein the operations further comprise:
   receiving the second record; and
   recording the second record on the blockchain.

6. The device of claim 5, wherein the second record includes the second identifier for the receiver, a second timestamp, the file identifier, or a combination thereof.

7. The device of claim 6, wherein the second record includes second information in the second record that is signed with a second private key of the receiver.

8. The device of claim 7, wherein the second information comprises the second timestamp, the file identifier, and the hash for the file.

9. The device of claim 8, wherein the operations further comprise:
   decrypting the hash for the file in the first information using a first public key of the sender, thereby creating a first decrypted hash for the file;
   decrypting the hash for the file in the second information using a second public key of the receiver, thereby creating a second decrypted hash for the file;
   comparing the hash for the file in the first record with the first decrypted hash, the hash for the file in the second record, and the second decrypted hash; and
   responsive to a failed comparison, issuing a second alert.

10. The device of claim 9, wherein the operations further comprise:
    reviewing the blockchain to determine whether a service level agreement has been met; and
    issuing a notification including a determination of compliance with the service level agreement.

11. The device of claim 9, wherein the operations further comprise:
    reviewing the blockchain to determine whether the file was not delivered to all recipients; and
    issuing a second notification including a determination of delivery to all the recipients.

12. The device of claim 9, wherein the operations further comprise:
    reviewing the blockchain to determine whether a data feed is complete; and
    issuing a notification including a determination that the data feed is complete.

13. The device of claim 9, wherein the operations further comprise:
    reviewing the blockchain to determine whether a node receives and transmits all files flowing through the node; and
    issuing a third notification including a determination of whether the node receives and transmits all the files flowing through the node.

14. The device of claim 9, wherein the operations further comprise:
    reviewing the blockchain to determine whether compliance with regulatory requirements for sensitive personal information have been met; and
    issuing a fourth notification including a determination of compliance with regulatory requirements for the sensitive personal information.

15. A non-transitory, machine-readable medium, comprising executable instructions that, when executed by a processing system including a processor, facilitate performance of operations, the operations comprising:

sending a record of sending a file and a hash for the file to a blockchain agent, wherein the blockchain agent transforms the record into a common record structure and writes the common record structure on a blockchain;

determining whether the blockchain comprises an indication that the file was received within a predetermined time period by a receiver; and sending an alert responsive to the predetermined time period expiring and that the blockchain does not comprise the indication that the file was received.

16. The non-transitory, machine-readable medium of claim 15, wherein the operations further comprise:

resending the file to the receiver responsive to the determining that the blockchain does not comprise the indication that the file was received after expiration of the predetermined time period.

17. The non-transitory, machine-readable medium of claim 16, wherein the operations further comprise:

sending a second alert responsive to exceeding several times that the blockchain does not comprise the indication that the file was received.

18. The non-transitory, machine-readable medium of claim 15, wherein the operations further comprise:

indicating that the file contains sensitive personal information;

reviewing the blockchain to determine whether compliance with regulatory requirements for the sensitive personal information have been met; and issuing a notification including a second determination of compliance with regulatory requirements for the sensitive personal information.

19. A method, comprising:

calculating, by a processing system including a processor, a hash for a file sent to one or more recipients; and sending, by the processing system, a record of sending the file and the hash for the file to a blockchain agent, wherein the blockchain agent records the record on a blockchain, and wherein the blockchain agent generates an alert responsive to a predetermined time period expiring beyond receiving the record that the blockchain agent did not receive a second record from each recipient of the one or more recipients comprising an indication that the file was received.

20. The method of claim 19, comprising:

reviewing, by the processing system, the blockchain to determine whether the file was not delivered to the one or more recipients; and issuing a notification, by the processing system, including a determination of delivery to the one or more recipients.

* * * * *